No. 764,020. PATENTED JULY 5, 1904.
R. THAYER.
ELECTRICALLY PROPELLED VEHICLE.
APPLICATION FILED APR. 11, 1904.
NO MODEL. 4 SHEETS—SHEET 2.
FIG. II.
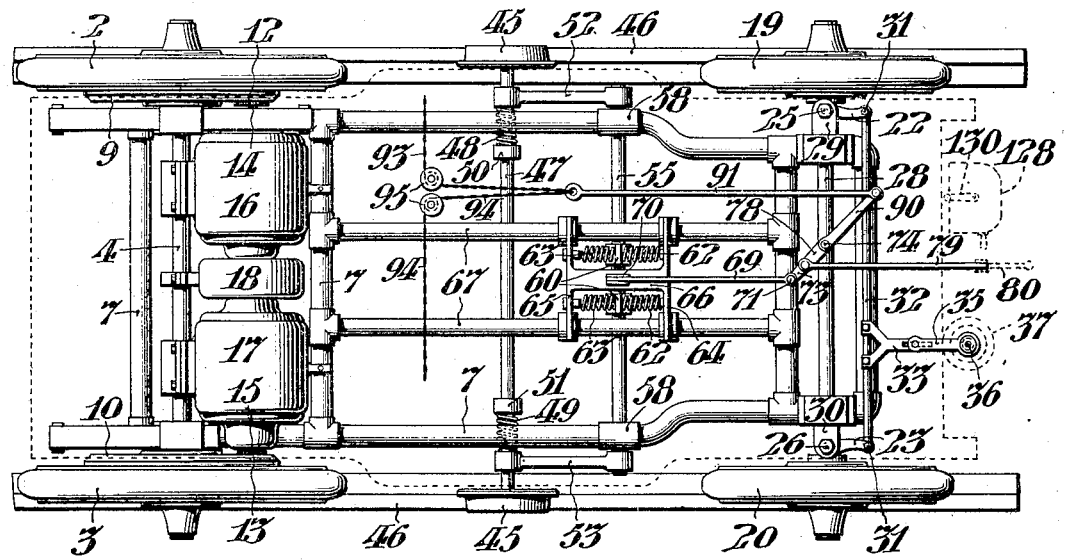
FIG. IV.
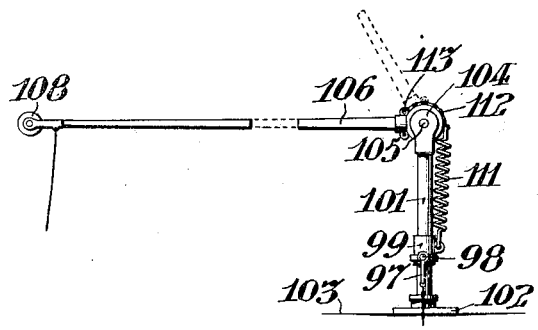
WITNESSES:
Clifton C. Hallowell
John C. Bergner
INVENTOR:
RUSSELL THAYER,
by Paige, Paul V Fraley
Attys.

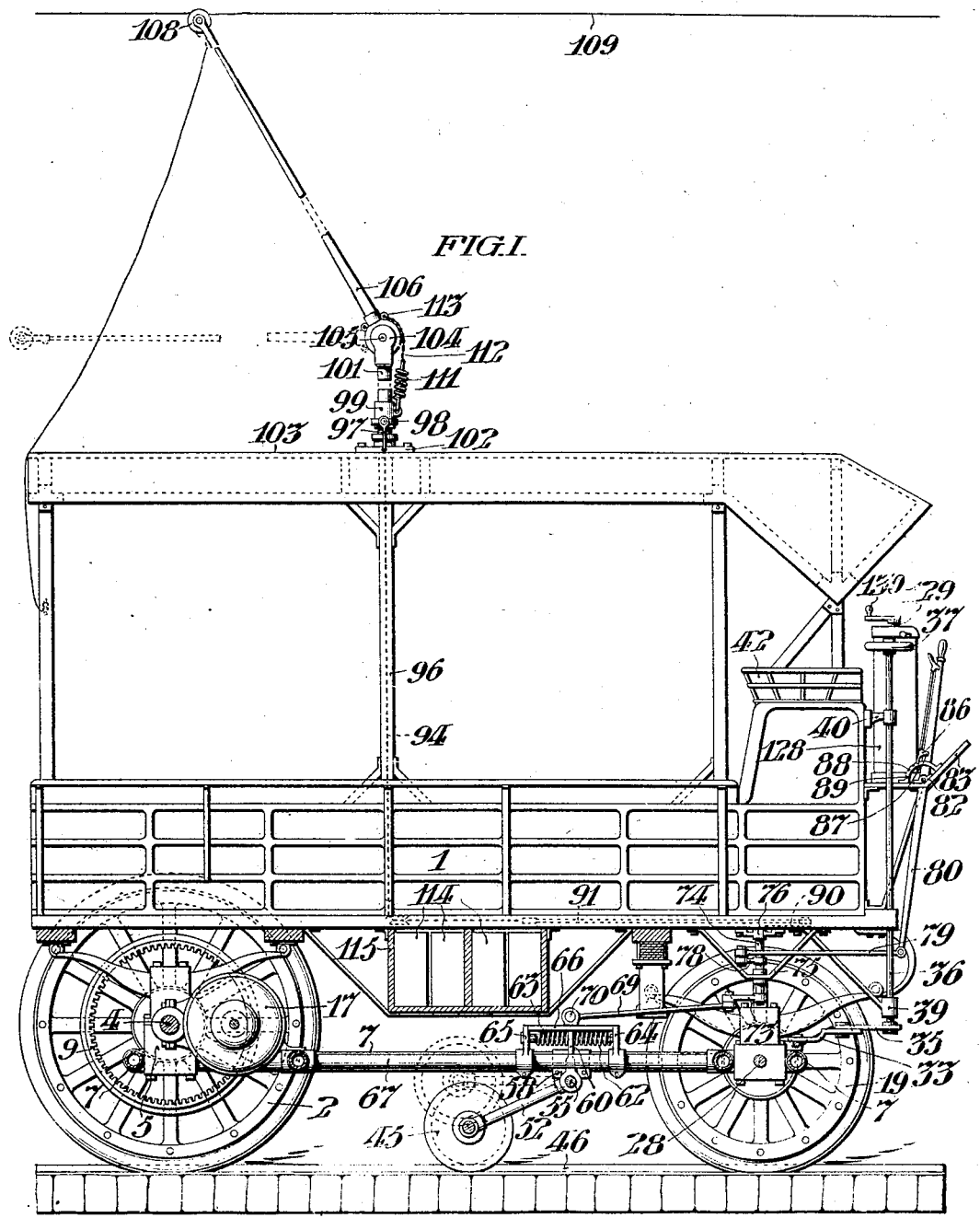

No. 764,020. PATENTED JULY 5, 1904.
R. THAYER.
ELECTRICALLY PROPELLED VEHICLE.
APPLICATION FILED APR. 11, 1904.
NO MODEL. 4 SHEETS—SHEET 3.
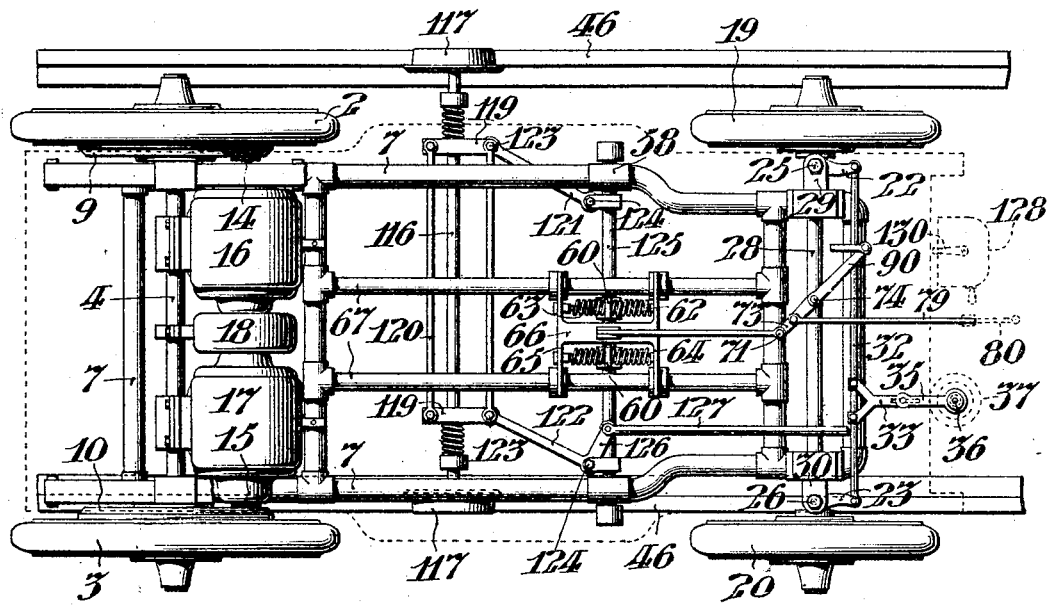
FIG. III.
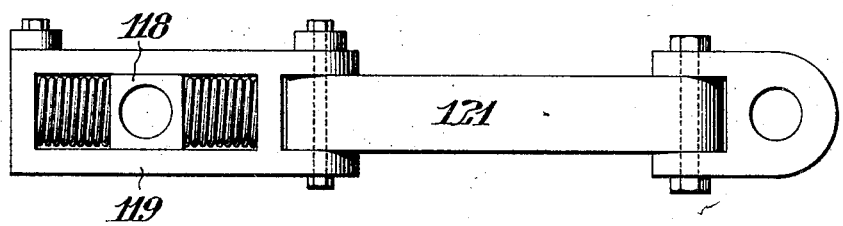
FIG. V.
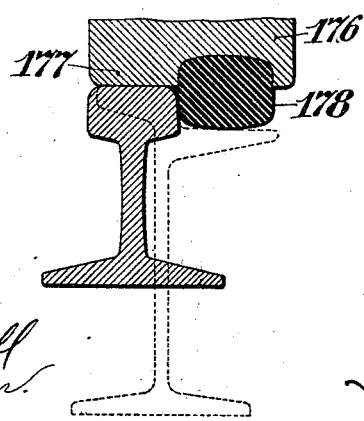
FIG. XV.
WITNESSES:
Clifton C. Hallowell
John C. Burgner
INVENTOR:
RUSSELL THAYER,
by Paige, Paul & Foley
Attys.

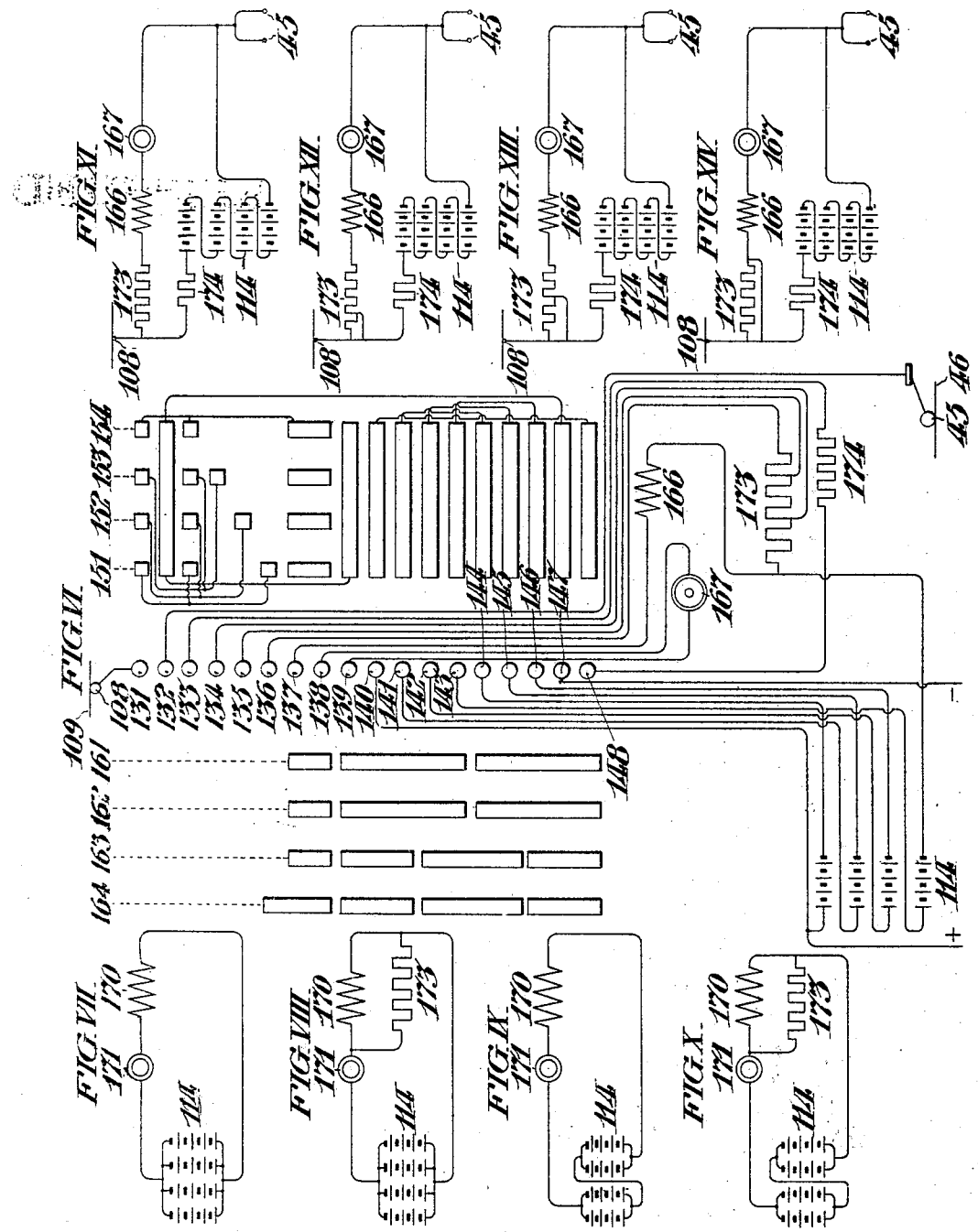

No. 764,020. Patented July 5, 1904.

UNITED STATES PATENT OFFICE.

RUSSELL THAYER, OF PHILADELPHIA, PENNSYLVANIA.

ELECTRICALLY-PROPELLED VEHICLE.

SPECIFICATION forming part of Letters Patent No. 764,020, dated July 5, 1904.

Application filed April 11, 1904. Serial No. 202,526. (No model.) REISSUED

*To all whom it may concern:*

Be it known that I, RUSSELL THAYER, of Philadelphia, in the State of Pennsylvania, have invented certain new and useful Improvements in Electrically-Propelled Vehicles, whereof the following is a specification, reference being had to the accompanying drawings.

My improvements are particularly applicable to established municipal electric-railway systems or trolley-lines, which under ordinary conditions are limited to passenger traffic at slow speed, determined by the delays incident to the discharge of passengers at intersecting streets and to temporary obstruction of the tracks by other vehicles than the trolley-cars; and it is the principal object of this invention to provide means whereby a system of the character described can be made to operate, in addition to the slowly-moving cars, a series of vehicles which, although normally occupying the same tracks as said cars and deriving their motive power from the same supply system, shall be capable of more rapid progress than said cars and without interfering therewith.

As hereinbefore described, my invention comprises an automobile provided with an electric motor and a storage battery constructed and arranged to traverse the railway-tracks of an overhead-trolley supply system with said motor in operative connection therewith and to traverse a trackless road-bed independently of said trolley system with said motor in operative connection with said battery, the arrangement being such that during the normal traverse of the vehicle with its motor in connection with the trolley system its battery is also in connection with the trolley system and arranged to be charged thereby. Therefore said vehicle upon being blocked by other traffic on the tracks of the system from which it derives its motive power can digress from the latter upon the trackless roadway or street-surface, pass the obstruction, and return to the tracks to resume its traverse of the latter in operative connection with the trolley supply system.

The operation of automobiles of the peculiar kind contemplated upon ordinary railway-tracks and in operative connection with an ordinary overhead-trolley supply system is advantageous, first, because of the economy incident to central localization of the power-generating plant and the minimum equipment of said vehicles with electrical apparatus; second, because of the greater speed attainable by such vehicles as compared with the cars on the same system, and, third, because of the greater range of movement of said vehicles as compared with the cars, which latter are of course limited to the extent of the railway-tracks.

It may be noted that my improved vehicles have all of the advantages of independent automobility which are characteristic of ordinary cabs, express-wagons, and similar vehicles propelled by any known means. For instance, the peculiar vehicles herein contemplated may be devoted to the use of passengers paying a higher rate than that required for the ordinary trolley-car service for the more rapid and direct service of such vehicles, due to their capacity to leave the tracks and utilize railways which otherwise are not in communication with each other and not capable of conveying ordinary cars from one to the other and their further capacity to proceed beyond the limits of such tracks. Of course such automobiles may also be utilized to rapidly deliver passengers' baggage and other freight, such as packages from department stores to places remote from the tracks of the trolley system, with an electrical equipment upon said vehicles much less weighty, complicated, and costly than that required for ordinary electrically-propelled automobiles, the storage-battery equipment required by my vehicles being essentially different from that of an ordinary automobile for the reason that the improved vehicles derive their motive power continuously and directly from the railway system, except for the minor intervals when it is necessary for them to digress therefrom, which digressions represent but a small fraction of the total mileage of said vehicles.

The embodiment of my invention hereinafter described also includes certain adjunctive features—for instance, means carried by the automobile aforesaid whereby a trolley-pole to engage the overhead supply-main, and contact devices to engage the subjacent railway-tracks are coöperatively connected, so as to be contemporaneously shifted to and from operative position under the control of the chauffeur, a laterally-adjustable support for said lower contact devices, permitting their operative connection with the railway-tracks while the vehicle-supporting wheels are traversing the adjoining trackless road-bed, and peculiar supporting-wheels for said vehicle, comprising flanges adapted to make electrical contact with the rails of the trolley supply system, and tires of insulating material which uphold the vehicle upon a trackless road-bed. Said embodiment of my invention also includes controlling mechanism adapted to make the necessary connections to operate the vehicle-motor directly in circuit with the railway system and independently of the storage battery, while simultaneously charging the storage battery, and to operate the motor in connection with the storage battery independently of the railway system.

As the ordinary trolley-railway supply-circuit is operated at a pressure of five hundred volts, a form of my invention, hereinafter described, includes a motor adapted to operate at that pressure in connection with said system and another motor arranged to be operated at a pressure of one hundred and twenty volts or less in connection with the storage battery.

My invention comprehends the various novel features of construction and arrangement hereinafter more definitely specified.

In the drawings, Figure I is a side elevation of an automobile conveniently embodying my improvements, the chassis being shown in vertical section. Fig. II is a plan view of the chassis shown in Fig. I. Fig. III is a plan view showing a modified form of chassis. Fig. IV is a side elevation showing the trolley-pole and its connections in inoperative position. Fig. V is an edge view showing the detailed construction of one of the parallel lever-arms and its connections by which the adjustable contact-wheels are supported in the form of my invention shown in Fig. III. Fig. VI is a diagram showing the wiring connections of the electrical controller. Figs. VII to X, inclusive, are wiring diagrams, respectively, showing the electrical connections corresponding with the four positions of the controller toward the left-hand side of Fig. VI, rendering the motor operative in connection with the battery under different conditions. Figs. XI, XII, XIII, and XIV are wiring diagrams showing the electrical connections corresponding with the four positions of the controller toward the right-hand side of Fig. VI, rendering the motor operative and charging the storage battery in connection with the railway system under different conditions. Fig. XV is a fragmentary sectional view showing a modified form of vehicle-supporting wheel.

Referring to Figs. I and II, the vehicle-body 1 is provided with rear supporting-wheels 2 3, whose axle 4 is mounted for rotation in the bearing-boxes 5 in the frame or chassis 7. Said wheels 2 and 3 are respectively provided with internal gears 9 and 10, engaged by the respective pinions 12 and 13 upon the alined shafts 14 and 15 of the two motors 16 and 17, which are connected by differential gearing 18, which may be of any convenient form. Said motors and gearing are suitably supported by said axle 4 and chassis 7, as indicated in Fig. II.

The front supporting-wheels 19 and 20 are respectively mounted in operative relation with the knuckle-levers 22 23, which turn upon the respective pivots 25 and 26 in the bearings 29 and 30 at the extremities of the front axle 28, which is stationary in the chassis 7. Said knuckle-levers 22 and 23 are connected by the pivots 31 with the cross-bar 32, which is provided with the rigid arm 33, operatively engaged with the lever 35, mounted upon the lower end of the shaft 36 of the steering-wheel 37. As shown in Fig. I, said shaft 36 is conveniently supported in the bearing-bracket 39 beneath the vehicle-body 1 and in the bearing-bracket 40, which extends beneath the chauffeur's seat 42.

The wheels 45, which are designed to make electrical contact with the railway-tracks 46, are mounted to rotate upon the axle 47, which is provided with springs 48 and 49, respectively interposed between the collars 50 and 51 on said shaft 47 and the adjacent ends of the arms 52 and 53, carried by the rock-shaft 55, so that, although said axle 47 is normally maintained in laterally central position with respect to the chassis 7, it is capable of shifting toward either side thereof with the wheels 45, so that the latter do not bind when traversing a curved track. Said rock-shaft 55 is mounted to oscillate in the bearings 58, fixed on the chassis 7, and is provided with the two vertical arms 60, whose upper ends are yieldingly connected by the springs 62 and 63, respectively, at the front and rear thereof, with the front cross-bar 64 and rear cross-bar 65 of the frame 66, which latter is mounted to slide longitudinally upon the parallel bars 67 of the chassis 7. Said slide-frame 66 is arranged to be shifted to raise and lower said contact-wheels 45 by the link 69, which is pivoted at 70 upon said frame and pivoted at its opposite end 71 upon the end of the lever-arm 73, which extends from the vertical rock-shaft 74. As shown in Fig. I, said shaft 74 is mounted to oscillate in the brackets 75 and 76, attached to the under side of the vehicle-body 1, and is provided with the lever-arm 78, connected by the link 79 with the lower end of the operating-lever 80, which is fulcrumed in the bracket 82 on the chauffeur's footboard 83. Said operating-lever 80 is provided with the latch-lever 86, pivoted thereon at 87 and arranged to detachably engage the notches 88 in the sector 89, mounted on said footboard 83. Said shaft 74 is provided at its upper end with the lever-arm 90, which, as shown in Fig. II, is connected by the link 91 to the flexible connectors 93 and 94, which extend around sheaves 95, and through the vertically-disposed tubes 96 to the links 97, which depend from the trunnions 98, projecting from the opposite sides of the sleeve 99, which latter is mounted to reciprocate vertically upon the standard 101. Said standard 101 is secured by its base-plate 102 upon the top frame 103 of the vehicle-body 1 and is provided at its top with the bifurcated bearing 104, which is mounted to rotate thereon and supports the pivot 105, upon which the trolley-pole 106 is mounted to oscillate. Said pole 106 is provided at its upper end with the trolley-wheel 108 for electrical connection with the overhead supply-main 109, and said pole 106 is arranged to be raised and lowered to and from said main by means of the flexible connector comprising the spring 111, which is attached at its lower end to the sleeve 99, and the chain 112, which extends from the upper end of said spring to the lug 113 on the hub of said pole.

The construction above described, including the manual operating-lever 80, is such that when said lever is thrust forward, as indicated in Fig. I, the contact-wheels 45 are depressed into electrical contact with the railway-tracks 46, which are electrically connected with one side of the current-supply system, and the trolley-pole 106 is contemporaneously uplifted to engage its wheel 108 in electrical contact with the overhead supply-main 109, where it may be retained by the engagement of the latch-lever 86 in a notch 88 of the sector 89. Upon release of the latch-lever 86 and reverse movement of said lever 80 toward the chauffeur's seat 42 the contact-wheels 45 are uplifted and the trolley-pole 106 lowered contemporaneously to the positions shown in dotted lines in Fig. I, wherein the vehicle is free to leave the tracks 46 and traverse a trackless road-bed, upon which it is propelled by the motor in operative connection with the storage battery 114, whose cells are conveniently supported beneath the vehicle-body 1 in the casing 115, as shown in Fig. I.

In some suburban extensions of municipal trolley systems the railway-tracks project so far above the road-bed as to render them difficult of access for the supporting-wheels of my improved vehicle, and therefore I contemplate providing laterally-adjustable means to connect said vehicle with such tracks without engagement of the vehicle-supporting wheels thereon. For instance, the trolley-pole 106 may be deflected laterally upon its swiveled support, so as to properly engage the overhead supply-main 109 and the tracks be engaged by the laterally-adjustable axle 116 and contact-wheels 117 (shown in Figs. III and V) substituted for the wheels 45 and the axle 47, above described. Said axle 116 is mounted in the bearing-boxes 118 in the end housings 119 of the frame 120, and said boxes are provided upon opposite sides with springs, as shown in Fig. V, so that the wheels 117 may yield upon encountering any obstruction upon the tracks without detriment to their supporting connections. Said frame 120 is supported for lateral movement by the parallel levers 121 and 122, whose rear ends are connected therewith by the pivots 123 and whose front ends are connected by the pivots 124 with the rock-shaft 125, which latter is otherwise similar to the rock-shaft 55. (Shown in Fig. II.) Said lever 122 being provided with the arm 126, said frame 120, together with the contact-wheels 117, may be shifted laterally in either direction by the link 127, which latter may be operated by a vertically-disposed lever under control of the chauffeur and similar to the lever 80, above described.

It is to be understood that the motors 16 and 17, above described, may be each adapted to operate under two hundred and fifty volts pressure in series in connection with the trolley system and in multiple in connection with the battery 114. However, in view of the difficulty in insulating storage batteries under ordinary conditions it is undesirable to operate them at a pressure above one hundred and twenty-five volts, and therefore I prefer to employ the arrangement hereinafter described, wherein the motor 16 is adapted to operate at the full pressure of an ordinary trolley system—viz., five hundred volts—and the motor 17 is adapted to operate at a pressure of one hundred and twenty volts or less in connection with the storage battery 114. Said arrangement is such that an auxiliary resistance is included in the circuit with the storage battery during the charging of the latter by connection with the trolley system, and said motor 17 is excluded from the battery-circuit and also from the active motor-circuit during the charging operation, and when the motor 16 and battery 114 are disconnected from the trolley supply system the motor 16 remains idle and the battery is connected in operative relation with said motor 17.

The electrical connections for the several operations above described are conveniently effected by the controller having the casing 128, (shown in Fig. I,) which incloses the vertical shaft 129, provided with the operating-handle 130. Said controller comprises the series of stationary terminals 131 to 148, inclusive, which are shown at the central portion of Fig. VI, and the two groups of movable contact members shown, respectively, at the right and left hand sides of said stationary terminals in said figure, which are carried by said shaft 129. The group of contacts shown at the right-hand side of said figure comprises four different points or regions which are designed to be brought successively into electrical contact with said stationary terminals and are indicated in Fig. VI by the respective vertical dotted lines 151, 152, 153, and 154.

The group of movable contacts shown at the left-hand side of Fig. VI comprises four different points or regions which are designed to be brought successively into electrical contact with said stationary terminals and are indicated by the respective vertical dotted lines 161, 162, 163, and 164.

Referring to Fig. VI, it may be noted that the upper terminal 131 is connected with the trolley 108, engaged with the overhead supply-main 109, and the terminal 132 is connected with the contact-wheels 45 beneath the vehicle. The field 166 and armature 167 are components of the motor 16, and the field 170 and armature 171 are components of the motor 17. The variable resistance 173 is arranged to be included in circuit with either motor-field to vary the current supplied thereto. The resistance 174 is arranged to be included in circuit with the battery 114 to minimize the current delivered to the latter during its charging operation, but is excluded from the battery-circuit during the discharging operation.

It is to be understood that Fig. XI shows the circuit relations of the motor 16, battery 114, &c., when the contacts on the vertical line 151 register with the terminals 131, &c. Similarly Figs. XII, XIII, and XIV show the circuit relations corresponding to the registration with said terminals of the movable contacts on the respective lines 152, 153, and 154.

Fig. VII shows the circuit relations of the storage battery 114, motor 17, &c., when the contacts on the line 161 register with the terminals 131, &c. Similarly Figs. VIII, IX, and X show the circuit relations corresponding to the registration with said terminals of the contacts on the respective lines 162, 163, and 164.

In all of the positions of the controller illustrated in Figs. XI to XIV, inclusive, the motor 16 is in operative relation with the trolley supply system and the storage battery 114 is connected to be charged thereby. In all of the positions of the controller illustrated in Figs. VII to X, inclusive, the vehicle apparatus is disconnected from the trolley system and the storage battery 114 is connected to discharge through the motor 17, and thereby propel the vehicle.

It may be noted that whereas in Figs. XI to XIV, inclusive, the motor 16 is arranged to propel the vehicle under pressure of five hundred volts from the trolley supply system in Figs. VII to X, inclusive, the motor 17 is arranged to propel the vehicle under a less pressure, the arrangement shown in Figs. VII and VIII providing for a pressure of sixty-four volts and the arrangement shown in Figs. IX and X providing for a pressure of one hundred and twenty volts.

It is to be understood that my invention is not limited to the particular controlling means or arrangement of circuits above described. For instance, the apparatus preferably includes means to effect the reverse rotation of the motors and an electrically-actuated brake.

Although it is desirable under some conditions to make electrical connection with the railway-tracks 46 solely by means of the contact-wheels 45 or 117, constructed and arranged as above described, it is to be understood that other means may be employed for that purpose. For instance, I have indicated in Fig. XV a wheel 176, which comprises a metallic flange or tire 177, adapted to make electric contact with the tracks, so as to establish operative connection with the trolley system, but having an insulating-tire 178, conveniently formed of rubber, which overhangs the track-tread when the flange 177 is operatively engaged therewith, but which may serve to support the vehicle and insulate it from a trackless road-bed traversed by it. Moreover, although it is convenient to provide my improved vehicle with means to mechanically connect the overhead-trolley pole and subjacent electrical connecting devices, so as to contemporaneously effect their manual operation, it is to be understood that such mechanism is not essential to the operation of my invention, and it is to be further understood that various modifications may be made in the construction and arrangement of my invention without departing from its essential features.

I claim—

1. An automobile provided with an electric motor and a storage battery; having wheels constructed and arranged to traverse the tracks of a railway supply system, with said motor in operative connection with said system, and, to traverse a trackless road-bed, independently of said system, with said motor in operative connection with said battery, substantially as set forth.

2. An automobile provided with an electric motor and a storage battery, having wheels constructed and arranged to traverse the tracks of a railway supply system, with said motor in operative connection with said system and said battery connected to be charged thereby, and, to traverse a trackless road-bed, independently of said system, with said motor in operative connection with said battery, substantially as set forth.

3. An automobile provided with an electric motor and a storage battery, having wheels constructed and arranged to traverse the tracks of a railway supply system, with said motor in operative connection with said system, and, to traverse a trackless road-bed, independently of said system, with said motor in operative connection with said battery; and, manually-operative means arranged to contemporaneously transfer the operative circuit connections of said motor from said system to said battery, substantially as set forth.

4. In an automobile provided with an electric motor and a storage battery; constructed and arranged to traverse the railway-tracks of a system comprising an overhead-trolley supply-main, and to traverse a trackless road-bed independently of said trolley system; a trolley-pole arranged to engage said main; and, adjustable means arranged to electrically connect said motor with the railway-tracks, substantially as set forth.

5. In an automobile provided with an electric motor and a storage battery; constructed and arranged to traverse the railway-tracks of a system comprising an overhead-trolley supply-main; and to traverse a trackless road-bed independently of said trolley system; a trolley-pole arranged to engage said main; and, an adjustable contact-wheel arranged to electrically connect said motor with the railway-tracks, substantially as set forth.

6. An automobile provided with an electric motor and a storage battery, having wheels constructed and arranged to traverse the tracks of a railway system comprising an overhead-trolley supply-main, and, to traverse a trackless road-bed independently of said trolley system; a trolley-pole arranged to engage said main; and, coöperatively-related means arranged to electrically connect said motor with said overhead main and railway-tracks, substantially as set forth.

7. In an automobile provided with an electric motor and a storage battery; constructed and arranged to traverse the railway-tracks of a system comprising an overhead supply-main, and to traverse a trackless road-bed independently of said system; a trolley-pole arranged to engage said main; a contact-wheel arranged to engage said tracks; and, manually-operative means to raise and lower said trolley-pole and contact-wheel, substantially as set forth.

8. In an automobile provided with an electric motor and a storage battery; constructed and arranged to traverse the railway-tracks of a system comprising an overhead supply-main, and to traverse a trackless road-bed independently of said system; a trolley-pole arranged to engage said main; a contact-wheel arranged to engage said tracks; and, manually-operative means connecting said trolley-pole and contact-wheel arranged to contemporaneously adjust them, substantially as set forth.

9. An automobile provided with an electric motor and a storage battery, having wheels constructed and arranged to traverse the tracks of a railway supply system, with said motor in operative connection with said system, and said battery connected to be charged thereby and, to traverse a trackless road-bed, independently of said system, with said motor in operative connection with said battery; an auxiliary resistance; and, means to connect said resistance in circuit with said battery during the charging operation and to eliminate said resistance from said circuit during the discharging operation, substantially as set forth.

10. An automobile provided with wheels constructed and arranged to traverse the tracks of a railway supply system, and to traverse a trackless road-bed independently of said system; a storage battery; a plurality of electric motors; means arranged to alternately effect the operation of said motors in connection with the supply-mains of said system and in connection with said battery, substantially as set forth.

11. An automobile provided with wheels constructed and arranged to traverse the tracks of a railway supply system, and to traverse a trackless road-bed, independently of said system; a storage battery; two electric motors; means arranged to alternately effect the operation of said motors in connection with the supply-mains of said system and in connection with said battery, substantially as set forth.

12. In an automobile constructed and arranged to traverse the railway-tracks of an overhead-trolley supply system and to traverse a trackless road-bed independently of said trolley system; a storage battery; two electric motors; and, a manually-operative controller, comprising coöperative switching means arranged to alternately effect the operation of said motors, respectively in connection with the supply-mains of said system and in connection with said battery, substantially as set forth.

13. In an automobile constructed and arranged to traverse the railway-tracks of an overhead-trolley supply system and to traverse a trackless road-bed independently of said system; a storage battery; two electric motors, respectively constructed and arranged to operate at different voltages; and means arranged to alternately effect the operation of said motors, respectively in connection with the supply-mains of said system and in connection with said battery, substantially as set forth.

14. In an automobile constructed and arranged to traverse the railway-tracks of an overhead-trolley supply system and to traverse a trackless road-bed independently of said system; a storage battery; two electric motors having alined shafts respectively in operative relation with opposite supporting-wheels of said vehicle; differential gearing connecting said shafts; and, means arranged to alternately effect the operation of said motors, respectively in connection with the supply-mains of said system and in connection with said battery, substantially as set forth.

15. In an automobile constructed and arranged to traverse the railway-tracks of an overhead-trolley supply system and to traverse a trackless road-bed independently of said system; a wheel on said vehicle comprising a metallic flange arranged to make electrical contact with one of said railway-tracks; and, a tire on said wheel arranged to insulate it from a trackless road-bed traversed by said vehicle, substantially as set forth.

In testimony whereof I have hereunto signed my name, at Philadelphia, in the State of Pennsylvania, this 29th day of March, 1904.

RUSSELL THAYER.

Witnesses:
ARTHUR E. PAIGE,
CLIFTON C. HALLOWELL.